March 6, 1928.
A. W. LEET
1,661,430
COMBINED FERTILIZER, DISTRIBUTOR, AND SIDE DRESSER
Filed Jan. 9, 1926     2 Sheets-Sheet 1
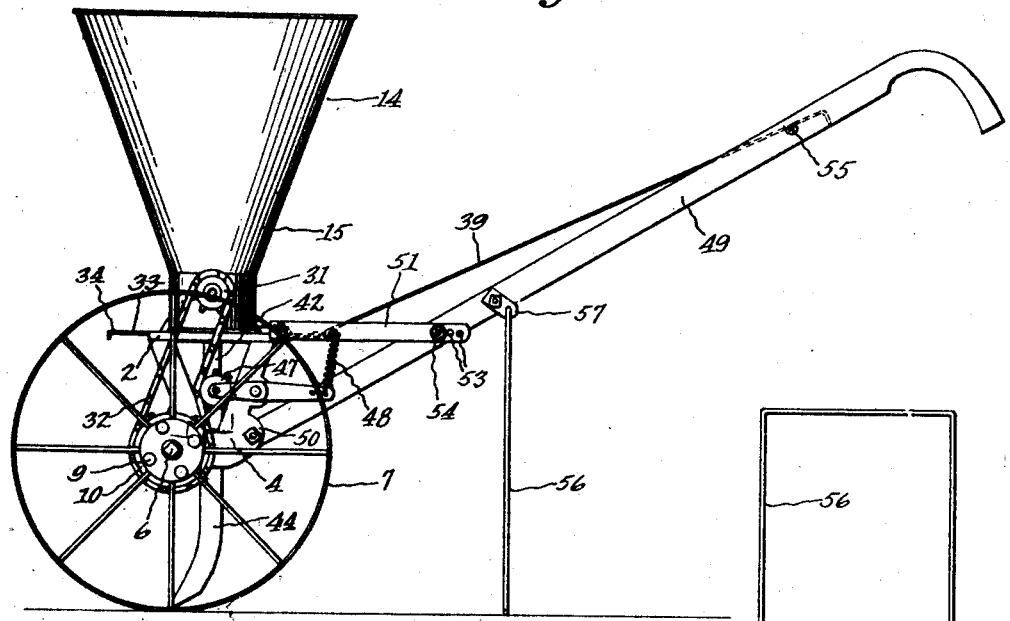
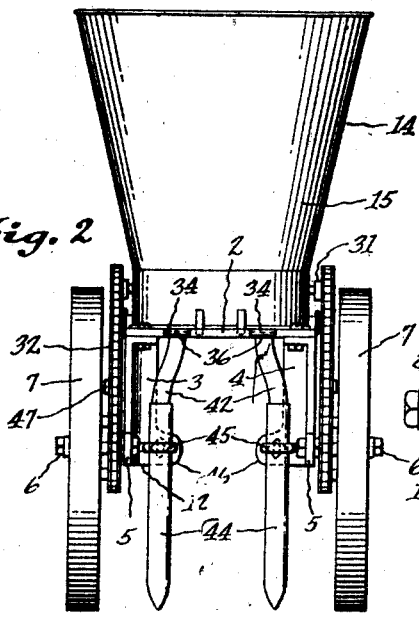
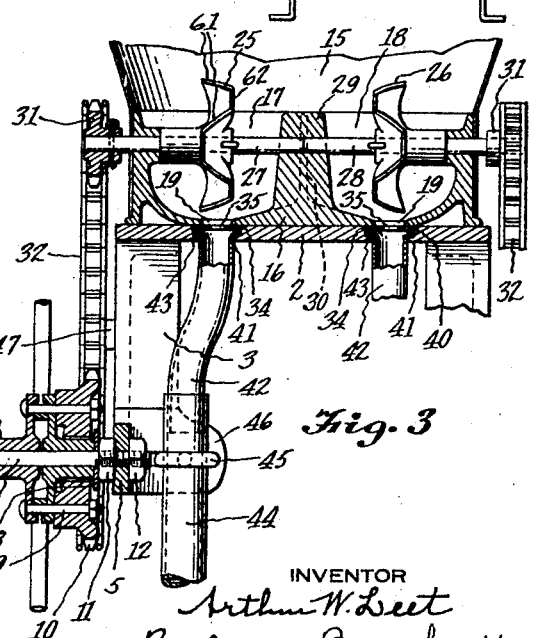
INVENTOR
Arthur W. Leet
By John A. Bommhardt
Attorney

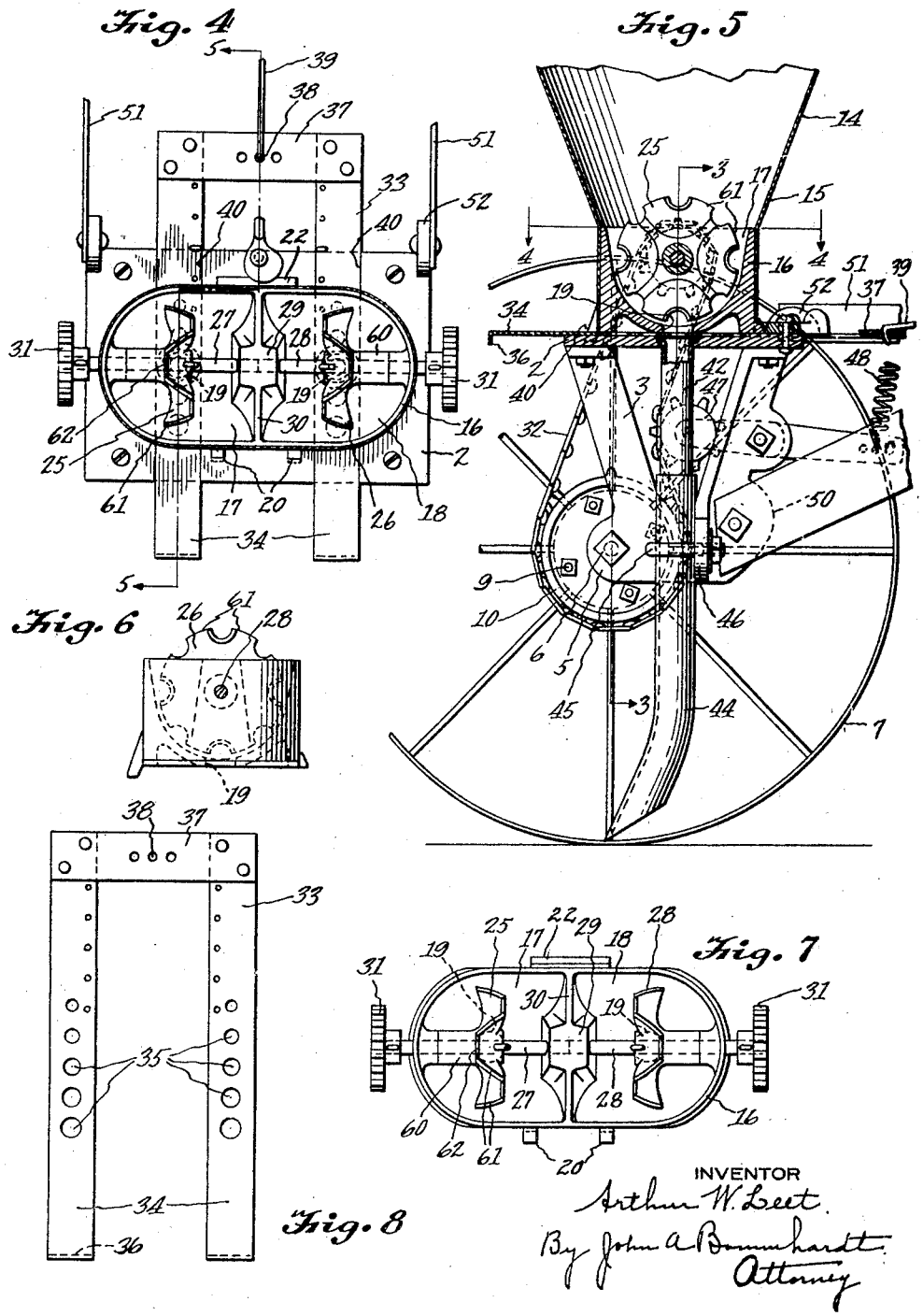

Patented Mar. 6, 1928.

1,661,430

UNITED STATES PATENT OFFICE.

ARTHUR W. LEET, OF MADISON, OHIO, ASSIGNOR TO THE IRON KING IMPLEMENT COMPANY, OF MADISON, OHIO, A CORPORATION OF OHIO.

COMBINED FERTILIZER, DISTRIBUTOR, AND SIDE DRESSER.

Application filed January 9, 1926. Serial No. 80,267.

This invention relates to new and useful improvements in agricultural implements and more especially to a combined distributor and side-dresser.

One object of the invention is to provide an improved fertilizer, distributor and sidedresser for plants in the process of growing.

Another object is to provide an improved implement of simple yet strong construction and light in weight, manually operated.

Another object is to provide an implement in which the plant straddling parts are evenly balanced for ease of operation.

Another object is to provide a manually operated implement in which the weight of the machine and the fertilizer load are balanced and carried on the wheels, reducing the fatigue of the operator.

Another object is to provide means for adjusting the height of the operator's hand grips.

Another object is to provide means for supporting the implement when at rest.

Another object is to provide an implement of such construction that the parts may be compactly packed for knock down shipment and easily assembled.

Another object is to provide an implement in which the fertilizer feed can be adjusted for a predetermined amount of distribution.

Another object is to provide means for opening the feed to a set position for a predetermined amount and for shutting off the feed.

Another object is to provide feed spouts forming shoes for opening the furrows and fertilizer conveyors for conveying fertilizer to the opened furrows.

Another object is to provide means for vertically adjusting the combined furrowopening shoes and conveyors for varying the depth at which the fertilizer is to be placed.

Another object is to provide means for horizontally adjusting the combined furrowopening shoes and conveyors for varying the width between the furrows.

Another object is to provide a double hopper and double chain drive providing balance of weight and even distribution of fertilizer.

In the drawings:—

Fig. 1 is a side elevation showing the implement at rest.

Fig. 2 is a front view.

Fig. 3 is an enlarged sectional view on line 3—3 of Fig. 5.

Fig. 4 is a similar view on line 4—4 of Fig. 5.

Fig. 5 is a similar view on line 5—5 of Fig. 4.

Fig. 6 is a detail view of the hopper base and agitator unit.

Fig. 7 is a plan view of the same.

Fig. 8 is a plan view of the hopper feed plate.

Fig. 9 is a detail view of the rest legs.

The main supporting frame is indicated generally at 1 and comprises a base plate 2 supported by and bolted to right and left hand V-shaped leg members 3 and 4 respectively carrying at their lower forward extremities 5 axle bolts 6 on which are mounted wheels 7. Bolted as at 9 to hubs 8 are driving sprockets 10, said bolts clamping the wheel spokes between the hub halves. The axle bolts 6 screw into ears 5 and are locked on either side by lock nuts 11 and 12. Washers 13 space the wheel hubs from lock nuts 11. With this simple axle construction the wheels and axles may be removed for compactness of shipping space and easily assembled. The hopper indicated generally at 14 comprises a funnel shaped sheet metal hopper 15 mounted on a cast iron hopper base 16 divided into two compartments 17 and 18, each compartment having an outlet hole 19 in the bottom thereof.

Hopper base 16 is detachably mounted and secured on base plate 2 by means of inclined toes 20 integrally formed on the front of said hopper base, depending downwardly and outwardly. Toes 20 extend into and engage square holes 21 in base plate 2. The rear of hopper base 16 has an integrally formed sloping shoulder 22 adapted to be lockingly engaged by an eccentric 23 loosely riveted as at 24 to base plate 2.

Means for agitating, crushing and forcing fertilizer from the hopper thru the spouts, are provided by separably driven agitators 25 and 26 in compartments 17 and 18 respectively. Aligned shafts 27 and 28 are mounted transversely in hopper base 16, the butting ends journaling a bearing 29 formed in partition 30. The outer ends of shafts 27 and 28 project through hopper base 16 and have driven sprockets 31 mounted thereon. Sprockets 31 are driven by chains 32 from driving sprockets 10 mounted on the wheels. Chain tighteners 47 are pivoted on bridge members 3 and 4 and are tensioned by springs 48.

Agitators 25 and 26 are pinned on shafts 27 and 28 directly above outlet holes 19. The blades feed the fertilizer to the outlet holes 19, at the same time crushing any bumps that occur. Means for regulating the amount of fertilizer feed through the outlet holes is provided by a substantially U-shaped hopper feed adjustment plate 33 having legs 34 provided with graduated holes 35 and terminating in downturned tips 36, the legs joined by a crossplate 37 are provided with a centrally disposed hole 38 to receive the hooked end of a bar 39. The legs 34 are slidably mounted in longitudinally spaced grooves 40 formed in the top of base plate 2. The various pairs of graduated holes 35 in legs 34 are adapted to register with feed holes 19 and the feed spout tubes 42. In this manner the amount of fertilizer feed through the feed spouts to the ground is regulated. Stops for spotting the holes 35 are provided by cotter pins 58 placed in holes 59. For shutting off the flow of fertilizer, plate 33 is pulled back by rod 39 limited by downturned tips 36, closing holes 19.

Outlet holes 41 are provided in base plate registering with outlet holes 19 of hopper base 16. Flexible feed tubes 42 are mounted in the countersunk portions 43 of outlet holes 41, the depending tube ends fitting into the top of feed spouts 44. Feed spouts 44 are adjustably clamped by hangers 45 to slotted ears 46 formed on bridge members 3 and 4. The lower ends of spouts 44 are bent forward and cut with a sharp level forming shoes or furrow-openers and fertilizers conveyors at the same time. When the nuts of hangers 45 are loosened, the spouts may be adjusted vertically or sidewise to enable the operator to vary the width and depth at which the fertilizer may be placed in the ground.

Handle bars 49 are bolted to ears 50 formed on bridge members 3 and 4, and braced by brace strips 51 riveted to ears 52 formed on base plate 2. Spaced holes 53 provide adjustable bolting as at 54 to bars 49 for raising or lowering the height of the hand grips. Near the hand grips, bars 49 are spaced by a rod 55 which is also adapted to form a rest for the end of the hopper feed adjustment plate which is placed within convenient reach of the operator.

Stand legs are formed by a U-shaped rod 56 with out-turned ends for engagement with the ground clips 57 bolted to bars 49 to provide bearing brackets. As shown in Fig. 1 the legs are depending vertically resting on the ground. As the implement is nearly balanced very little weight is carried by the legs. When operating, the legs are turned up along the sides of bars 49 out of the way.

Agricultural authorities everywhere are recommending the distribution of various kinds of fertilizer, as a side dressing while plants are in the process of growing. The distributor and side-dresser described, is light in weight, of strong yet simple construction, and as a hand operated machine, the load is balanced and carried on the wheels relieving the operator of having to carry any weight at the hand grips while pushing or operating.

The double fertilizer hopper and double chain drive balances the weight of the implement and insures even distribution of fertilizer.

With the feed regulating means shown, the implement can be economically operated by setting the feed plates to feed a predetermined amount of fertilizer to be applied to a given size tract under cultivation.

The shape of the agitators 25 and 26 is an especially desired feature. Each agitator may be said to consist of a hub 60 from which project radially a series of blades 61 inclined respectively in opposite directions, with respect to the line of rotation, and the adjacent blades are connected at their nearest edges by a web having a notch 62, whereby, when the agitators are rotated they will have a cutting or pulverizing action as well as an action tending to throw the material first one way and then the other, which will effectively break up any bumps and reduce the material to a powdered condition sufficient to flow easily thru the feed openings. It is also to be noticed that the assembly of the shoes is very simple and adjustment easy, since each shoe 44 is held by an eye bolt 45 which can be loosened to adjust the shoe, either vertically or laterally, the flexible pipe 42 accommodating the various adjustments without being loosened or removed.

I claim:

In a distributor, the combination of a frame having a depending leg, a hopper thereon, a flexible discharge pipe leading from the hopper, a tubular shoe into which the lower end of the flexible pipe is telescoped, said shoe being adjustable either vertically or laterally, and means on the frame to hold the shoe at adjustment, said means consisting of an eye-bolt surrounding the shoe and extending into a slot in the leg.

In testimony whereof, I do affix my signature.

ARTHUR W. LEET.